Jan. 24, 1950   E. H. LAND   2,495,527
LIGHT FILTER OPAQUE TO VISIBLE LIGHT
AND TRANSMITTING INFRARED RADIATION
Filed March 5, 1946

WAVELENGTH IN MILLIMICRONS

INVENTOR
Edwin H. Land
BY
Donald R. Brown
Attorney

Patented Jan. 24, 1950

2,495,527

UNITED STATES PATENT OFFICE 2,495,527

LIGHT FILTER OPAQUE TO VISIBLE LIGHT AND TRANSMITTING INFRARED RADIATION

Edwin H. Land, Cambridge, Mass., assignor to Polaroid Corporation, Cambridge, Mass., a corporation of Delaware Application March 5, 1946, Serial No. 652,159

1 Claim. (Cl. 88—114)

This invention relates to signal apparatus designed for signalling by means of infrared radiation at spectral regions invisible to the human eye and to selectively light-absorbing materials for use with such signal apparatus.

The particular object of the invention is to provide such apparatus embodying a source of heat and light radiations and having a light-filtering material which has increased absorption of visible light with increased transmission of infrared radiation, and has increased stability under adverse conditions of usage.

Another object is to provide such material in the form of sheets or films of polyvinyl alcohol dyed with several direct dyes, so chosen, with respect to their absorption characteristics, that they substantially totally absorb visible light, but allow high transmission of infrared radiation.

Further objects provide an apparatus having a light-filtering material of the above characteristics wherein said plastic sheet comprises polyvinyl alcohol containing a direct dye, and said sheet is laminated to a sheet of glass having light-absorption characteristics permitting high transmission of infrared radiation.

The invention accordingly comprises the apparatus possessing the construction, combination of elements and arrangements of parts which are exemplified in the construction hereinafter described, and the scope of the application of which will be indicated in the claim.

Figure 1:
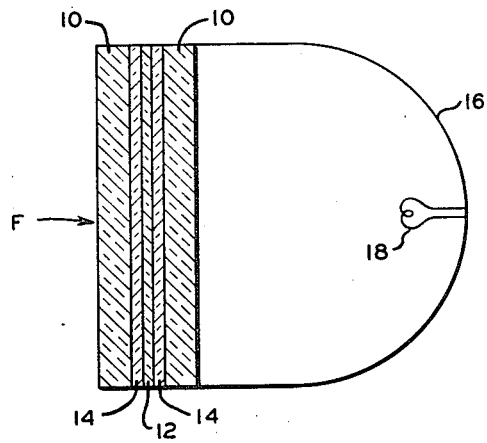
Figure 2:
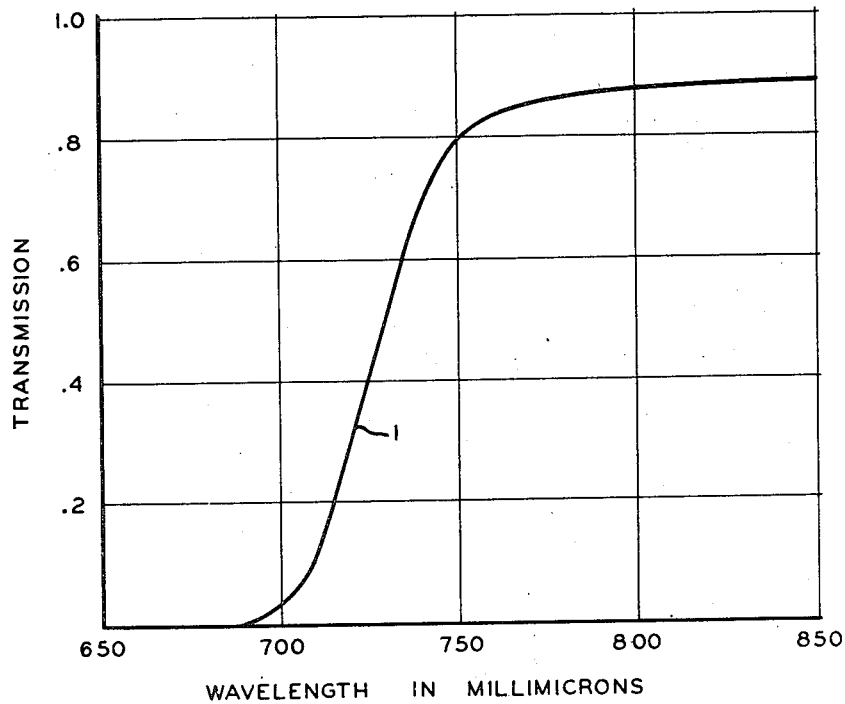

For a fuller understanding of the nature and objects of the invention, reference should be had to the following detailed description taken in connection with the accompanying drawings, wherein:

Figure 1 is a sectional view illustrating diagrammatically one embodiment of the invention; and Fig. 2 is a graph illustrating the light-transmitting properties of one embodiment of the invention.

In accordance with the present invention, it has been found possible to produce a light-filtering material having more uniform characteristics, greater stability and resistance to heat, a more complete cutoff of the visible light, and a sharper cutoff between visible radiations and infrared radiations than previously believed possible. In order to produce such an improved light-filtering material, it has been found that polyvinyl alcohol incorporating direct dyes gives the improved results. The direct dyes can be incorporated either by imbibition or by casting. Both processes are found to provide a filter material of excellent quality possessing the desired characteristics in regard to both spectral transmission and heat and light stability. Of the two methods, the imbibing method is preferred since it permits of more rapid production and errors can be more readily corrected.

Of the various direct dyes which have been found satisfactory for the manufacture of a product having the improved results set forth in the above objects, the most satisfactory combinations are as follows:

*Dye combination 1*

Niagara Sky Blue 6B (C. I. 518) _____ 300% National Aniline
Solantine Red 8BL (C. I. 278) _____ 150% National Aniline
Stilbene Yellow 3GA Conc. (C. I. 622) ____ 100% General Dyestuff

*Dye combination 2*

Erie Fast Brown 3RB___ 150% National Aniline
Pontamine Fast Green 5BL _____ 100% Du Pont In Fig. 1, element 18 represents an incandescent lamp of relatively high wattage, such for example as a 100-watt bulb, mounted in any suitable reflecting housing 16 provided in front thereof with a light filter F. In accordance with the invention, housing 16 and filter F are so constructed and secured together as to be wholly light-tight except for such radiation as is transmitted by filter F. The present invention is particularly concerned with the production of devices of the type shown in Fig. 1, which can be used for secret signalling by means of the infrared radiation emitted by lamp 18 while at the same time very little of the visible radiation from said lamp is permitted to escape and reveal the presence or operation of the device. This objective is complicated by the fact that the infrared radiation usually found most useful for signalling is in those regions of the spectrum closely adjacent the extreme red end of the visible spectrum. In order therefore to accomplish this objective, it is essential that filter F absorb as much visible light as possible, but that its degree of transmission increase very sharply in the near infrared in order to transmit as much radiation as possible in that region. A further complication is the fact that since filter F will usually be used close to the lamp 18, and since the latter will emit a relatively high degree of heat, both the filter itself and the light-absorbing substance therein must posses maximum stability to heat. It is also highly desirable that filter F possess substantial stability against conditions of moisture, since the signalling devices of the invention will usually be used out-of-doors and frequently under adverse weather conditions.

Optical filters of the conventional types heretofore in use have been found totally unsuitable for the purposes of the invention. For example, gelatin filters of the Wratten type do not possess heat stability to the degree desired in the practice of the present invention. Previously available all glass filters do not have desired properties due to the poor absorption qualities of the inorganic coloring agents.

Referring now to the light filter F of Fig. 1, there is shown a preferred form of the present invention. In this filter F there are provided two outer sheets of glass 10 adapted to form a protective covering for the polyvinyl alcohol filter. In some cases, one or more of these glass sheets may be provided with definite optical characteristics so as to improve the efficiency of the light filter and to alter its spectral characteristics to produce desired results as described in the copending application of William F. Amon, Jr., for Signal apparatus, Serial No. 652,158, filed March 5, 1946 (now abandoned). Between the glass layers 10 there is provided a direct dyed sheet 12 of polyvinyl alcohol. This is secured to sheets of glass 10 by means of suitable layers of adhesive 14, to form a composite lamination. This composite lamination is suitably mounted in the reflector 16 containing the source 18 of light and heat radiations. In the use of such a signalling apparatus, it has been found that the temperature in the neighborhood of the filter reaches values exceeding 100° C. With the filters of the past, such temperatures have been completely destructive to the filtering element.

The glass sheet 10 is preferably formed of a "water white" glass having a low iron content. Such a glass is particularly useful because of its high transmission in that range of the spectrum from 800 to 1000 millimicrons. A few examples of such glass are Kopp glass; Pittsburgh Plate Glass Company, Water White plate glass #4; Libby-Owens-Ford, Color-clear, glazing, quality X6; and J. R. Donelly Company, Water-White glass.

It has been found that the spectral efficiency of the filter is considerably affected by the use of "green" glasses, i. e., those glasses which, when examined from the edge, exhibit a green color. This green color, which is caused by an appreciable iron content in the glass, acts to absorb a considerable portion of radiation above 800 millimicrons.

The direct dyed polyvinyl alcohol sheet is preferably formed in the following manner. A .5% solution of the following dyes is added to a 50% methanol 50% water by volume mixture:

| Dye | Parts Dye |
| --- | --- |
| Niagara Sky Blue 6B (300%) | 60 |
| Solantine Red 8BL (150%) | 53 |
| Stilbene Yellow 3GA Conc. (100%) | 83 |

The dye solution is maintained at a temperature of 100–100° F. in a preferred example. A polyvinyl alcohol sheet .005" thick is imbibed in this solution for approximately 8 minutes. The methanol serves two purposes: to prevent solution of the polyvinyl alcohol in water and to obtain even dye penetration.

The dye solution dip is followed by a wash under a vigorous spray of acetone at room temperature, and then 4 minutes in acetone at room temperature to remove most of the water from the sheet. Further drying of the sheet in an oven at 200° F. for 2 minutes or more is desirable but not essential.

Another method of direct dyeing a polyvinyl alcohol sheet is to use a .5% solution containing the following dyes in a water solution containing about 10% by weight of sodium sulfate:

| Dye | Parts Dye |
| --- | --- |
| Erie Fast Brown 3RB (150%) | 1 |
| Pontamine Fast Green 5BL (100%) | 2 |

A sheet of polyvinyl alcohol .005" thick is imbibed in such a solution for approximately 8 minutes. This is followed by a vigorous wash or scrubbing in 50/50 acetone/water at room temperature and then 4 minutes in acetone at room temperature. Following this, the sheet is dried in the same manner as before.

Another method of obtaining a dyed polyvinyl alcohol sheet is to mix the following materials in the proportions indicated:

| | |
| --- | --- |
| Polyvinyl alcohol | 850 lbs. |
| Niagara Sky Blue 6B (300%) | 10 lbs. 10 oz. |
| Solantine Red 8BL (150%) | 6 lbs. 15 oz. |
| Stilbene Yellow 3GA Conc. (100%) | 9 lbs. 6 oz. |
| Water to give desired viscosity. | |

Such a mix is then cast or extruded to give a sheet of the desired final shape and thickness. Fig. 2 shows a representative photometric curve of a sheet of polyvinyl alcohol formed in accordance with the last example. This curve is for a sheet .0045" thick. Curves of a similar type are obtained from a sheet of polyvinyl alcohol that has had the dyes incorporated by imbibition.

For the lamination of the polyvinyl alcohol sheet 12 to the glass sheets 10 several adhesives and processes have been found satisfactory. The first of these involves the use of plasticized polyvinyl butyral in accordance with the process set forth in U. S. Patent 2,356,250.

The second possible method of forming laminations of the polyvinyl alcohol sheet to the glass sheets is by the use of Plexigum lamination, Plexigum being an acrylate resin. Plexigum coated glass plates are sold by the American Window Glass Company and have the adhesive 14 secured to the sheet 10 as sold. One way of assembling these laminations is to heat the sheet of polyvinyl alcohol for at least half an hour at a temperature of 85 to 100° C. to remove moisture. The Plexigum layers are coated with a plasticizer such as dibutyl phthalate or dibutyl sebacate, and the whole assembly is laminated at a temperature of 100 to 105° C. and a pressure of approximately 5 to 10 pounds per square inch, for a time of 5 to 15 minutes. It has been found that pressure and heat are not essential to form the above lamination if the assembly is left standing for a period of 1 to 12 hours or more without being disturbed.

Another method of laminating the polyvinyl alcohol sheet to the glass sheets is by the use of commercially available, plasticized polyvinyl butyral films as the adhesive layers 14. Examples of these are "Saflex" and "Butacite." In this case a lamination is built up of a sheet of glass, a sheet of polyvinyl butyral, a sheet of dyed polyvinyl alcohol, a sheet of polyvinyl butyral, and another sheet of glass. This lamination is then autoclaved in oil at a temperature of 230° F. for a period of 2 hours under a pressure of 100 pounds per square inch. This lamination can also be autoclaved in air at a temperature of 235° F. for a period of 4–5 hours under a pressure of 75 pounds per square inch.

Another suitable method of using polyvinyl butyral as the adhesive layer, involving a suitable solvent plasticizer, is shown in U. S. patent application of Edwin H. Land and Robert P. Blake for Light polarizer and process of manufacture, Serial No. 450,424, filed July 10, 1942 (now abandoned).

As can be seen from curve 1 in Fig. 2, this embodiment of the invention comprises a filter transmitting substantially no light below 700 millimicrons and having high transmission in the near infrared, and more particularly in the neighborhood of 800 millimicrons. The curve shows that such a filter has an excellent, sharp cutoff in the wavelength band between about 700 millimicrons and 750 or 800 millimicrons. Although some visible light is passed, the spectral characteristics of such a filter are excellent for all purposes except those where absolute secrecy with respect to a nearby observer is required.

Since certain changes in the constructions set forth which embody the invention may be made without departing from its scope, it is intended that all matter contained in the above description or shown in the accompanying drawings, shall be interpreted as illustrative and not in a limiting sense.

What is claimed is:

A filter cutting off substantially all visible light below 700 millimicrons but showing high transmission in the near infrared, said filter being stable to temperatures of the order of at least 100° C. and comprising a sheet of polyvinyl alcohol of a thickness at least of the order of .005 inch dyed with a plurality of direct dyes, said dyes comprising approximately 60 parts of Niagara Sky Blue 6B (C. I. 518), approximately 53 parts of Solantine Red 8BL (C. I. 278) and approximately 83 parts of Stilbene Yellow 3GA Conc. (C. I. 622), the concentration of dye within said sheet being at least 3% by weight of said sheet, said dyes in said concentration transmitting substantially no radiation below 700 millimicrons, each of said dyes having a maximum absorption in a different range of the visible spectrum and having a high transmission in the near infrared.

EDWIN H. LAND.

REFERENCES CITED

The following references are of record in the file of this patent:

UNITED STATES PATENTS

| Number | Name | Date |
| --- | --- | --- |
| 1,379,166 | Case | May 24, 1921 |
| 2,193,035 | Matthews et al. | Mar. 12, 1940 |
| 2,237,567 | Land | Apr. 8, 1941 |
| 2,418,605 | Shepherd et al. | Apr. 8, 1947 |
| 2,420,270 | Thomas | May 6, 1947 |
| 2,444,492 | Blout et al. | July 6, 1948 |

Certificate of Correction

Patent No. 2,495,527 January 24, 1950

EDWIN H. LAND

It is hereby certified that error appears in the printed specification of the above numbered patent requiring correction as follows:

Column 3, line 70, for "100–100° F." read *100–110° F.*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*